United States Patent
Gurudath et al.

(10) Patent No.: US 11,157,786 B1
(45) Date of Patent: Oct. 26, 2021

(54) UNIFORMITY COMPENSATION REFINEMENT MECHANISM

(71) Applicants: Nikita Gurudath, Boulder, CO (US); Ziling Zhang, Boulder, CO (US); Scott Johnson, Boulder, CO (US); Nathan Young, Boulder, CO (US)

(72) Inventors: Nikita Gurudath, Boulder, CO (US); Ziling Zhang, Boulder, CO (US); Scott Johnson, Boulder, CO (US); Nathan Young, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/952,124

(22) Filed: Nov. 19, 2020

(51) Int. Cl.
| | |
|---|---|
| *G06K 15/10* | (2006.01) |
| *G06K 15/02* | (2006.01) |
| *H04N 1/60* | (2006.01) |
| *H04N 1/00* | (2006.01) |
| *H04N 1/401* | (2006.01) |

(52) U.S. Cl.
CPC ......... *G06K 15/102* (2013.01); *G06K 15/027* (2013.01); *G06K 15/1825* (2013.01); *G06K 15/1849* (2013.01); *H04N 1/00015* (2013.01); *H04N 1/00023* (2013.01); *H04N 1/00031* (2013.01); *H04N 1/00034* (2013.01); *H04N 1/00068* (2013.01); *H04N 1/00087* (2013.01); *H04N 1/4015* (2013.01); *H04N 1/603* (2013.01); *H04N 1/6041* (2013.01)

(58) Field of Classification Search
None
See application file for complete search history.

(56) References Cited

U.S. PATENT DOCUMENTS

| | | | |
|---|---|---|---|
| 7,597,418 B2 | 10/2009 | Mantel et al. | |
| 8,251,476 B2 | 8/2012 | Shin et al. | |
| 8,414,102 B2 | 4/2013 | Viturro et al. | |
| 8,743,396 B2 | 6/2014 | Bastani et al. | |
| 9,381,763 B2 | 7/2016 | Rius Rossell | |
| 9,700,908 B2 | 7/2017 | Baker et al. | |
| 2018/0234582 A1 | 8/2018 | Stanich et al. | |
| 2020/0274991 A1* | 8/2020 | Stanich | B41J 29/393 |

\* cited by examiner

*Primary Examiner* — Scott A Rogers
(74) *Attorney, Agent, or Firm* — Jaffery Watson Mendonsa & Hamilton LLP

(57) ABSTRACT

A printing system is disclosed. The printing system includes at least one physical memory device to store uniformity compensation logic and one or more processors coupled with the at least one physical memory device to execute the uniformity compensation logic to receive print image measurement data corresponding with each of a plurality of pel forming elements, generate a first set of intermediate images based on the print image measurement data, determine whether historical sets of intermediate images are available, generate first transfer functions corresponding to each of the pel forming elements based on the first set of intermediate images and the historical sets of intermediate images upon a determination that the historical sets of intermediate images are available and transmit the first transfer functions for each of the pel forming elements.

20 Claims, 9 Drawing Sheets

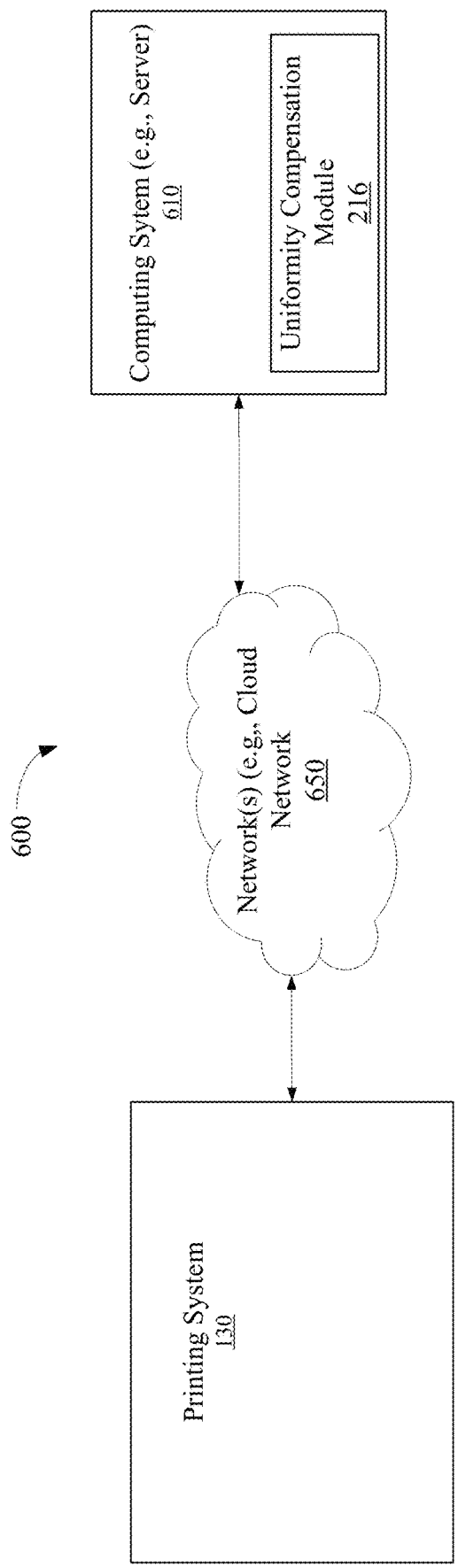

UNIFORMITY COMPENSATION REFINEMENT MECHANISM

FIELD OF THE INVENTION

The invention relates to the field of image reproduction, and in particular, to uniformity correction.

BACKGROUND

When correcting cross-web spatial non-uniformity of printed images by a print engine with multiple fixed print heads, relatively large non-uniformities may occur due to nozzle response differences between the print heads and within a printhead. However, conventional methods for correction of each print head nozzle may not properly fix this problem when the causes of the nozzle differences change with time.

Accordingly, a mechanism to perform improved nozzle uniformity compensation is desired.

SUMMARY

In one embodiment, a printing system is disclosed. The printing system includes at least one physical memory device to store uniformity compensation logic and one or more processors coupled with at least one physical memory device to execute the uniformity compensation logic to receive print image measurement data corresponding with each of a plurality of pel forming elements, generate a first set of intermediate images based on the print image measurement data, determine whether historical sets of intermediate images are available, generate first transfer functions corresponding to each of the pel forming elements based on the first set of intermediate images and the historical sets of intermediate images upon a determination that the historical sets of intermediate images are available and transmit the first transfer functions for each of the pel forming elements.

BRIEF DESCRIPTION OF THE DRAWINGS

A better understanding of the present invention can be obtained from the following detailed description in conjunction with the following drawings, in which:

FIG. 6 illustrates one embodiment of a uniformity compensation module implemented in a network.

DETAILED DESCRIPTION

A uniformity compensation mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
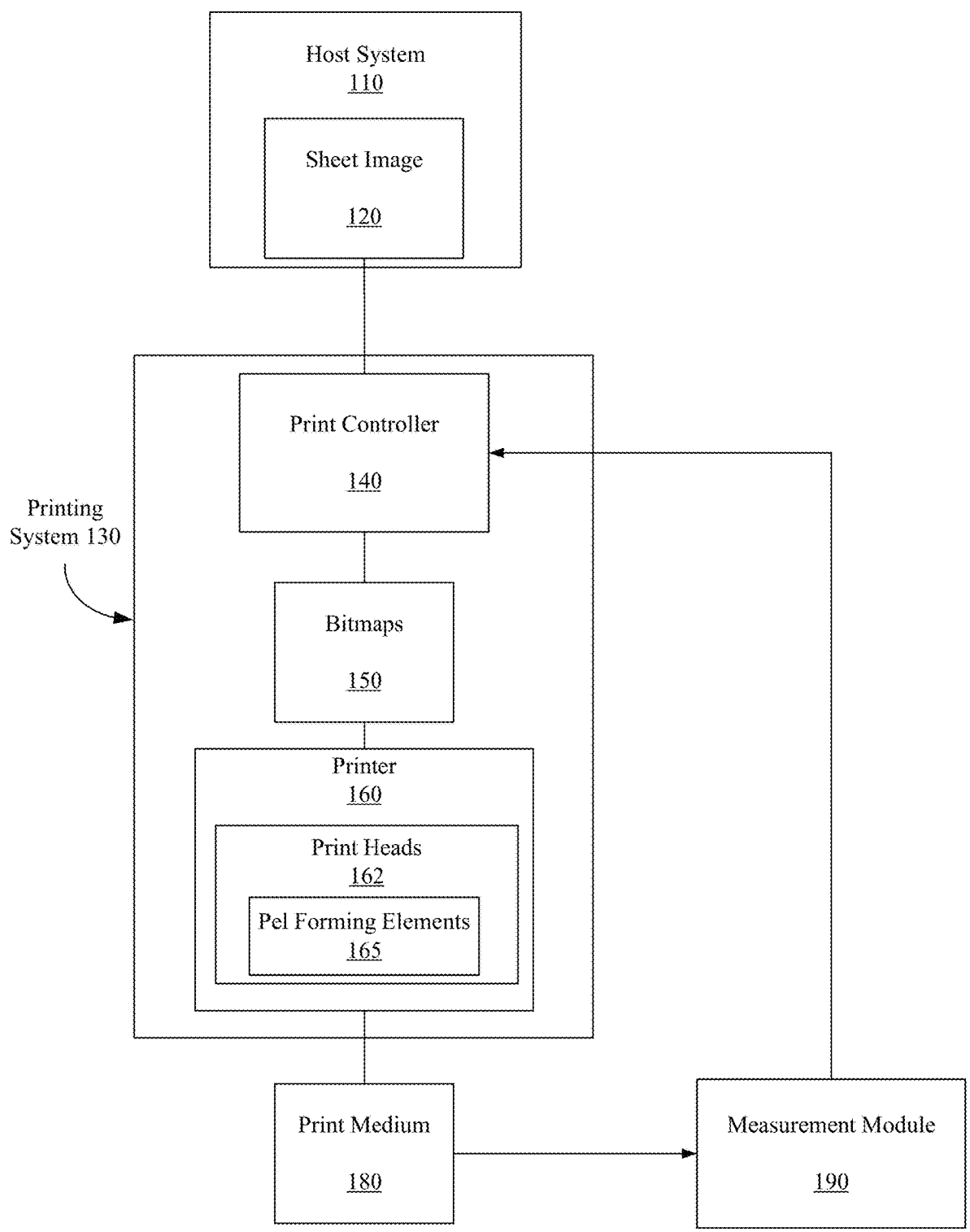
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser).

The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a uniformity compensation system to obtain measurements of the printed medium 180. The measured results are communicated to print controller 140 to be used in the uniformity compensation process. The measurement system may be a stand-alone process or be integrated into the printing system 130.

According to one embodiment, measurement module 190 may be a sensor to take measurements of printed images on print medium 180. Measurement module 190 may generate and transmit print image measurement data. Print image measurement data may be color response (e.g., RGB, optical density, etc.) data corresponding to a printed image that is either raw or processed. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer. In a further embodiment, print image measurement data may include a map information to correlate portions (e.g., a pel or plurality of pels) of the print image data to the corresponding pel forming elements 165 that produced the portions of the printed images.

Figure 2A:
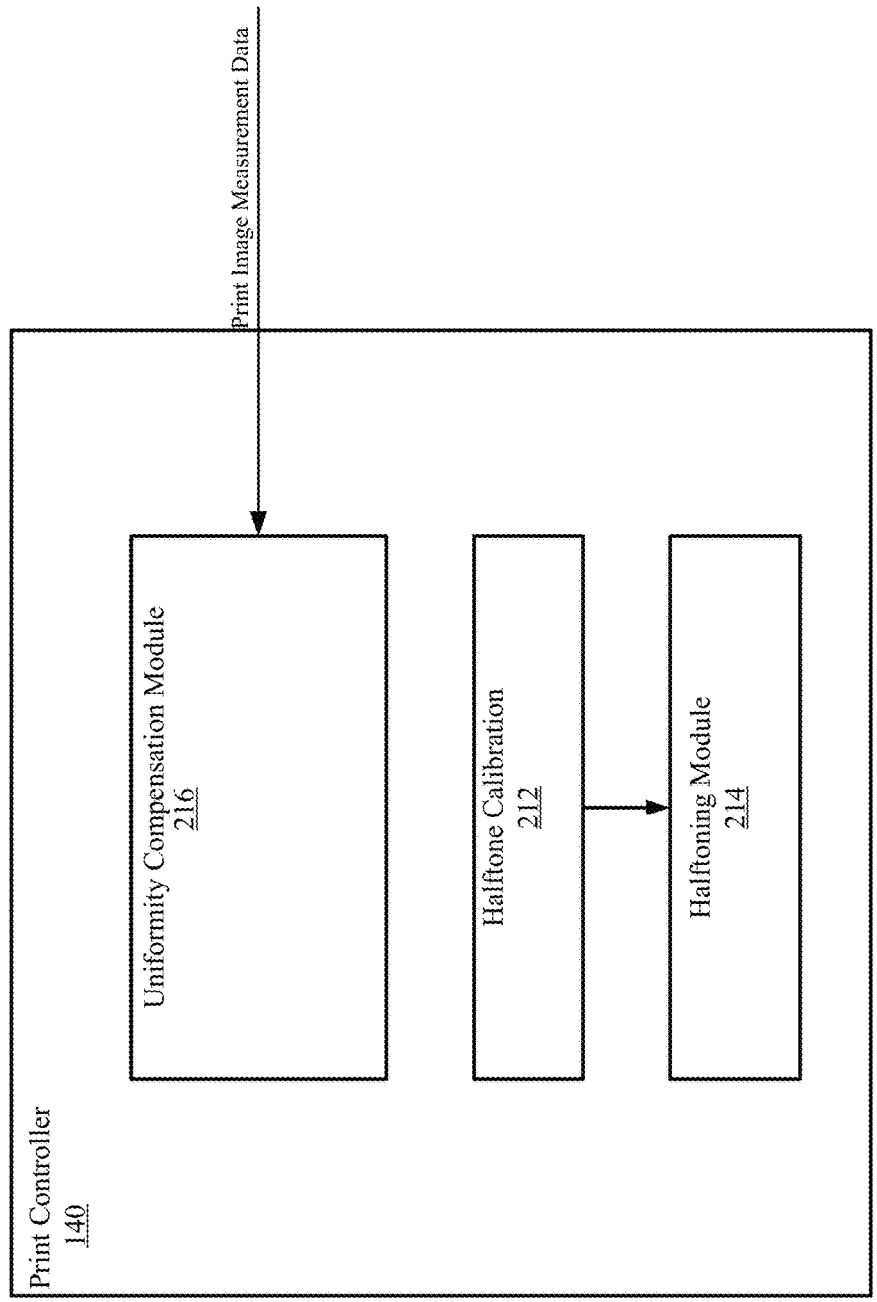
FIGS. 2A&2B illustrate block diagrams of embodiments of a print controller.
Figure 2B:
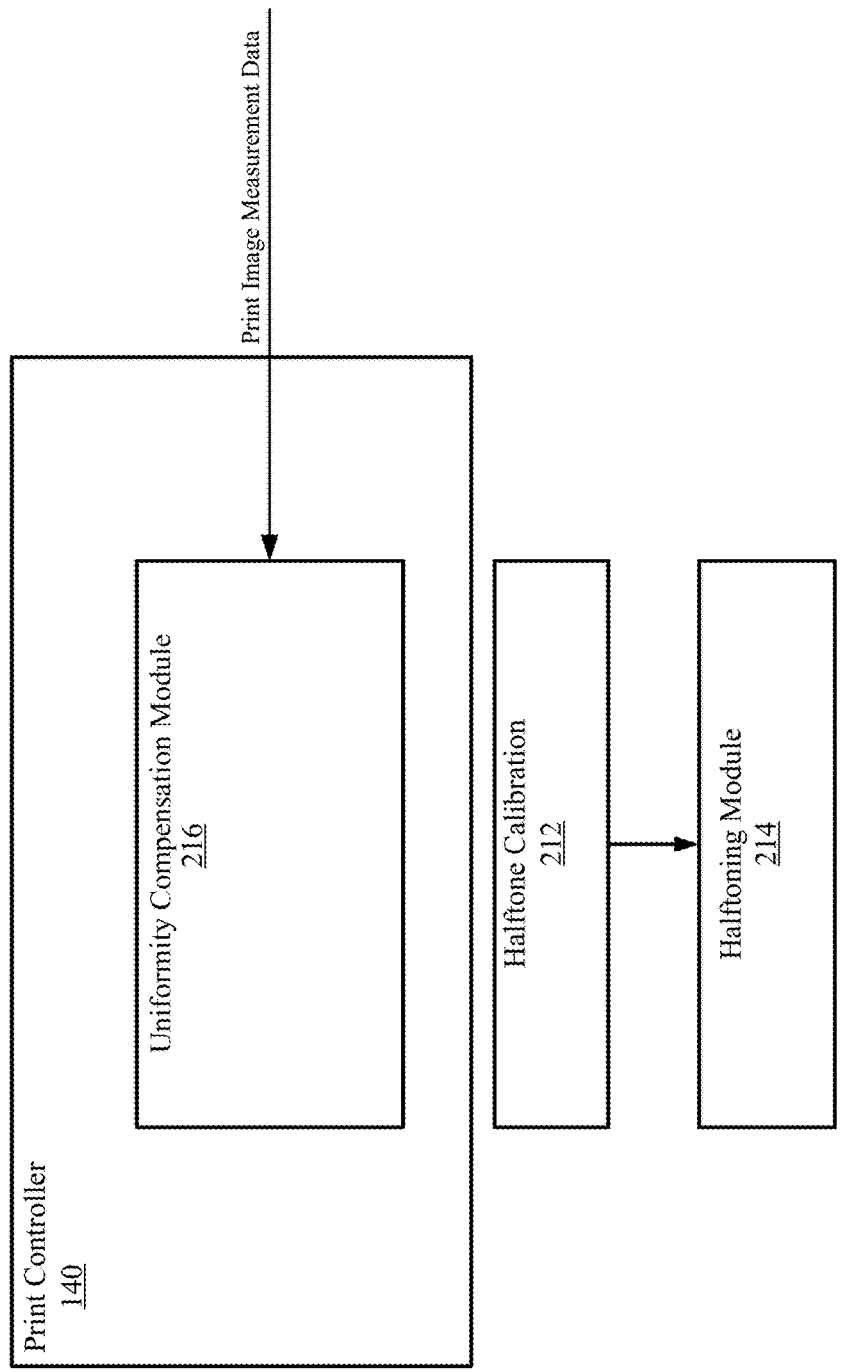

FIGS. 2A&2B illustrate embodiments implementing print controller 140. FIG. 2A illustrates a print controller 140 (e.g., DFE or digital front end), in its generalized form, including halftone calibration module 212, a halftoning module 214, and a uniformity compensation module 216. FIG. 2B illustrates an embodiment in which print controller 140 includes uniformity compensation module 216, while halftone calibration module 212 and halftoning module 214 are coupled externally. In either embodiment, the separate components may represent hardware used to implement the print controller 140. Alternatively, or additionally, the separate components may represent logical blocks implemented by executing software instructions in a processor of the printer controller 140.

Halftoning module 214 is operable to represent the sheet-side bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger drop sizes, beginning with zero and ending with a maximum drop size (e.g., threshold arrays such as single bit threshold arrays or multibit threshold arrays). In another embodiment, the halftone design may include a three-dimensional look-up table with all included gray level values.

According to one embodiment, uniformity compensation module 216 uses historical sets of print image data to achieve uniformity compensation. Historical sets of print image data may be stored in memory from capture events that occurred previously. As used herein, uniformity compensation is defined as a calibration to compensate for measured response differences versus a target response at a single pel, by a pel forming element 165 (e.g., print head nozzle).

In one embodiment, uniformity compensation module 216 receives print image measurement data corresponding with each of a plurality of pel forming elements and generates current intermediate images based on the print image measurement data. In a further embodiment, uniformity compensation module 216 determines whether historical sets of intermediate images are available. If available, both the generated current intermediate images and the historical sets of intermediate images are used to generate transfer functions corresponding to each of the pel forming elements. Otherwise, the transfer functions are generated using only the generated current intermediate images.

Uniformity compensation module 216 may subsequently transmit the transfer function data to the halftone calibration module 212. Halftone calibration module 212 may receive the transfer function data and generate uniformity compensated halftones to be applied by printer 160 in printing.

Figure 3:
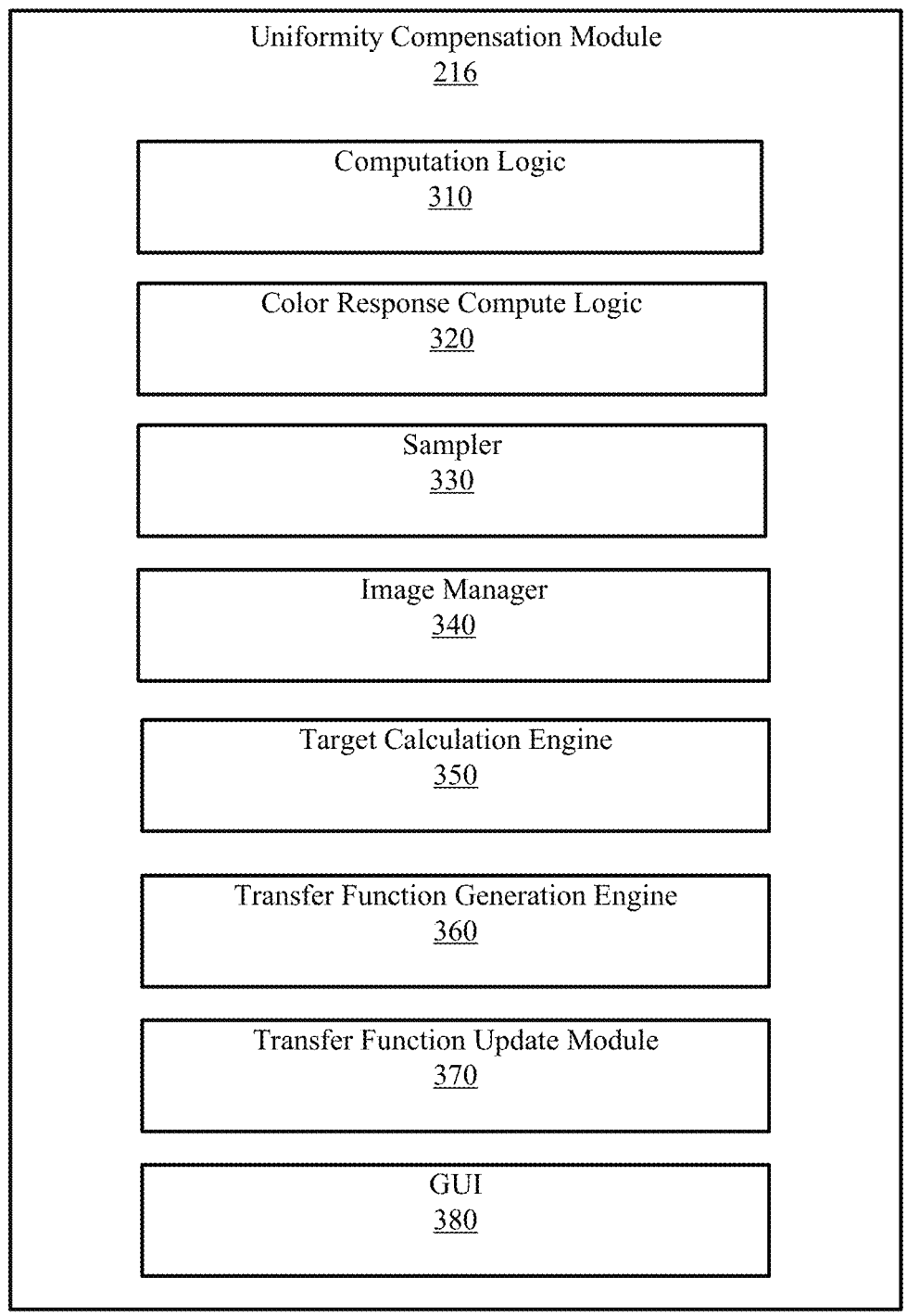
FIG. 3 illustrates one embodiment of uniformity compensation module.

FIG. 3 illustrates one embodiment of uniformity compensation module 216. As shown in FIG. 3, uniformity compensation module 216 includes computation logic 310. In one embodiment, computation logic 310 receives print image measurement data from measurement module 190 and computes a weighted average (or average value) of the print image measurement data. In such an embodiment, the print image measurement data includes color measurement data for each color plane (e.g., CMYK) that has been measured for a plurality test images printed at printing system 130. As a result, computation logic 310 generates a weighted average for the color measurement data from the plurality of printed test images.

In one embodiment, averaging involves performing an equal weighting to all measurement samples of input images, while a weighted average of the input images is the average of images obtained from a number (n) measurements with a weighting factor associated with each measurement. In a further embodiment, the measurements derived from the latest printed images are weighted higher than those obtained from images printed earlier in time. This method of averaging ensures that the samples obtained with a recent time stamp are given more preference in the averaging process since they would contain the most amount of relevant information pertaining to the characteristics of the pel forming elements.

Uniformity compensation module 216 may include a color response compute logic 320 that is implemented to generate color response data based on the received print image measurement data. In one embodiment, the color response data comprises an color response versus digital count, where digital count is a gray level representing the pels in the bitmap 150. In such an embodiment, the pels in bitmap 150 ranges from 0-255 for a typical 8 bit system. In one embodiment, the print image data need not be processed by the color response compute logic and may proceed to a following process upon a determination that the print image data has already been processed as color response data.

Since the print image measurement data was received at a predetermined image resolution, a scaling of the color response data may need to be performed to a full printer width. Accordingly if needed, sampler 330 performs a scaling of the color response data to the full printer width (e.g., a uniform grid across the web of the print medium for each pel forming element 165).

Image manager 340 generates and manages intermediate images that are implemented to perform uniformity compensation (e.g., via transfer functions, as described below). In one embodiment, the processed print image measurement data is stored as one or more image files. The typical format for storage of this data is in the form of PNG (Portable Network Graphics). These image files stored on the disk are termed as intermediate images because they represent the data for a particular period of time in between a uniformity compensation process. These images can be recalled at a later point in time while performing a refinement on the uniformity compensation transfer function. According to one embodiment, image manager 340 generates the set of intermediate images (or intermediate images) based on the scaled color response data. Subsequently, image manager 340 determines whether historical sets of intermediate images are available to perform uniformity compensation.

Upon a determination that the historical sets of intermediate images are not available, image manager 340 uses only the generated current intermediate images to perform uniformity compensation. However, image manager 340 uses the current intermediate images and the historical sets of intermediate images to perform uniformity compensation upon a determination that the historical sets of intermediate images are available. In such an embodiment, image manager 340 may perform an averaging of the current intermediate images and the historical sets of intermediate images. The averaging may be a weighted averaging with the current intermediate images being assigned a higher weighting than the historical sets of intermediate images.

Further, the weighting (e.g., time weighting) may apply higher magnitude weighting to the more recent data and progressively lower magnitude weighting to the older data. The weighting may be a power function such that if n=0 is the most recent data and n=10 is the oldest data, a very heavy weighting is applied to data n=0 and very little weighting to the data n=10.

According to one embodiment, image manager 340 may select a plurality of previously generated sets of intermediate images as the historical sets of intermediate images. In a further embodiment, the selection is based on one or more printer settings (or criteria) (e.g., paper type, printer conditions, print speed, resolution) associated with previously generated intermediate images that match reference printer criteria.

In yet a further embodiment, the selection may be based on criteria such as a number of the most recent historical sets of intermediate images and/or a data range of historical sets of intermediate images. By selecting historical sets of intermediate images based on relevant matching criteria, the uniformity compensation results are more refined and efficiently processed.

In a further embodiment, the criteria may be received via user interface 380 or a component external to printing system 130. In still a further embodiment, each set of generated intermediate images is tagged with the corresponding printer criteria associated with the printing that is represented in the intermediate images to enable subsequent selection of intermediate images that match a printer criteria (e.g., identify the printer criteria of the historical intermediate images and select those with 600 dpi resolution and 150 meter per minute paper speed). By including current and historical intermediate images in the uniformity compensation, the effect of transient issues (e.g., printhead temperature changes, measurement noise, paper deformities) are efficiently mitigated.

Target calculation engine 350 calculates a uniformity target compensation (e.g., color response target) that may represent an average response across all pel forming elements multiplied by a factor. Transfer function generation engine 360 generates a transfer function (or TF) for each of the pel forming elements 165. In one embodiment, a transfer function comprises a mapping of an input digital count to an output digital count for a system, where digital count is the gray level or color value representing the pels in a bitmap 150 (FIG. 1).

Figure 4:
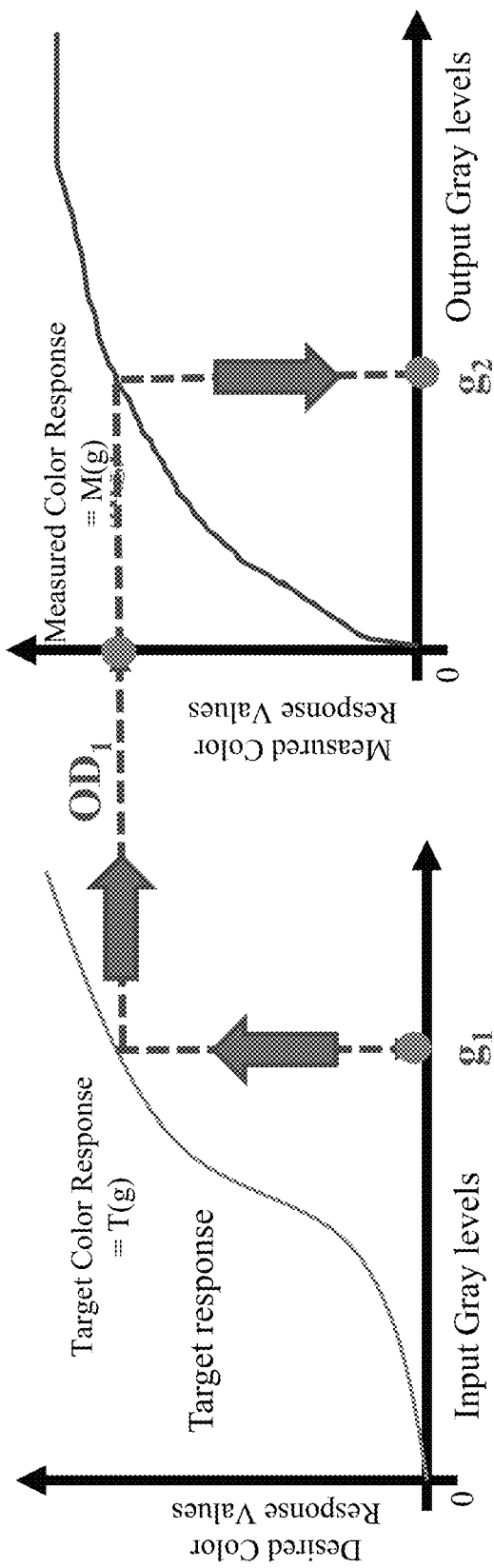
FIG. 4 illustrates one embodiment of a transfer function of a pel forming element.

Transfer functions are generated based on target color response (e.g., RGB value, optical density, reflected intensity, etc.) versus input digital count data and measured color response versus output digital count data). FIG. 4 illustrates one embodiment of a transfer function of a nozzle. The transfer function represented as a continuous function may defined as g_output=TF(g_input), where g represents a color value. Further, the expression g_output=$M^{-1}$(T(g_input)) =TF(g_input) represents the transfer function in terms of the target (T) and Inverse measured responses ($M^{-1}$). As shown in FIG. 4, the Transfer Function TF($g_1$)=$g_2$.

According to one embodiment, transfer function generation engine 360 generates transfer functions corresponding to each of the pel forming elements 165 based on the current intermediate images and the historical sets of intermediate images when the historical sets of intermediate images are available, and generates transfer functions corresponding to each of the pel forming elements 165 based only on the current intermediate images when the historical sets of intermediate images are not available.

Once generated, the transfer functions are transmitted for storage to be used to perform uniformity compensation. In one embodiment, uniformity compensation is performed by writing the transfer function data in a specific format by the transfer function update module 370, that is compatible with the printer 160. The printer 160 receives the transfer function files and applies the compensation to the halftone or image depending on the type of print engine (e.g., by modifying all of the thresholds in each column of the threshold array corresponding with the current halftone using the generated transfer function for each respective nozzle).

Figure 5A:
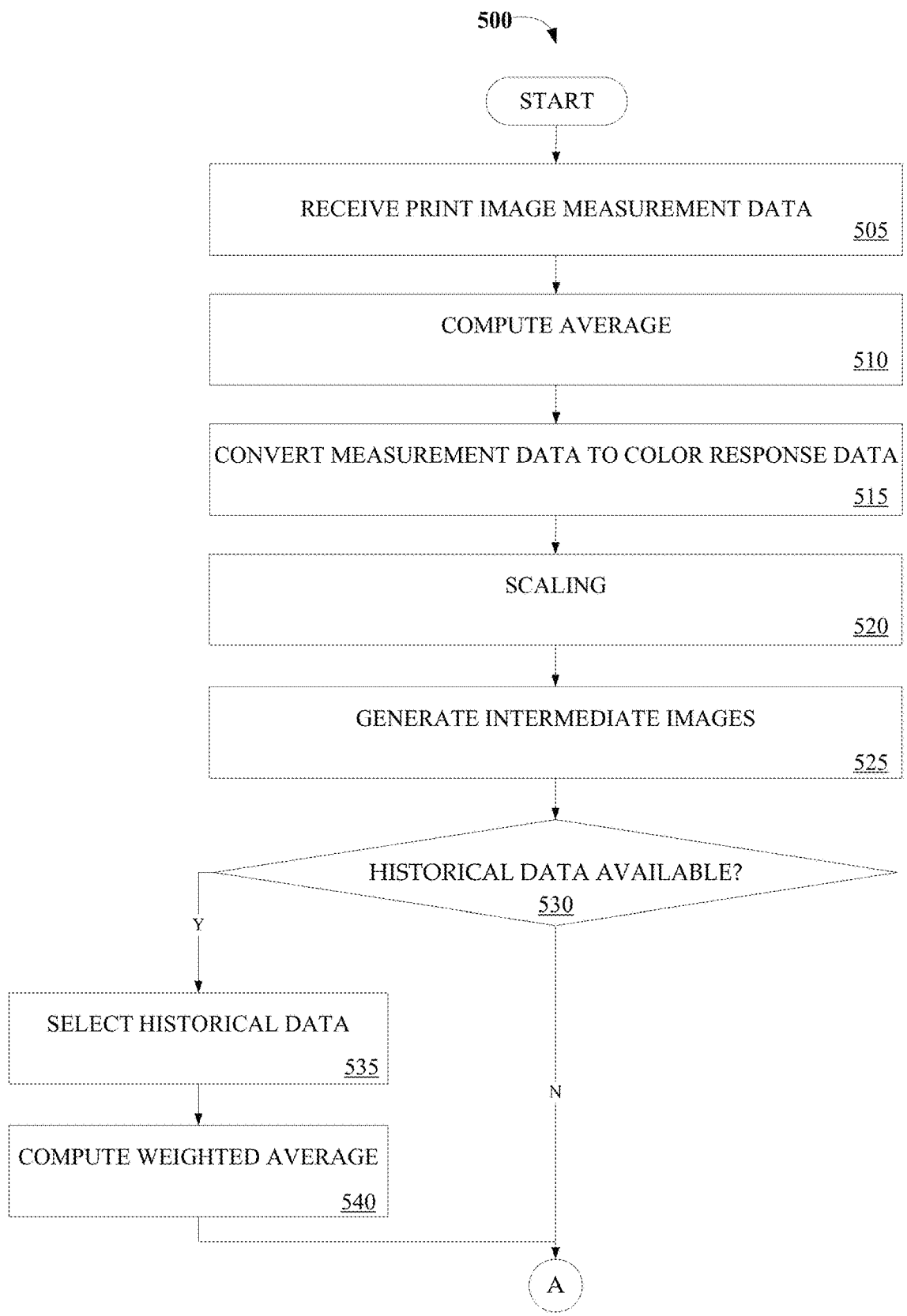
FIGS. 5A&5B is a flow diagram illustrating one embodiment of a uniformity compensation process performed by a printing system.
Figure 5B:
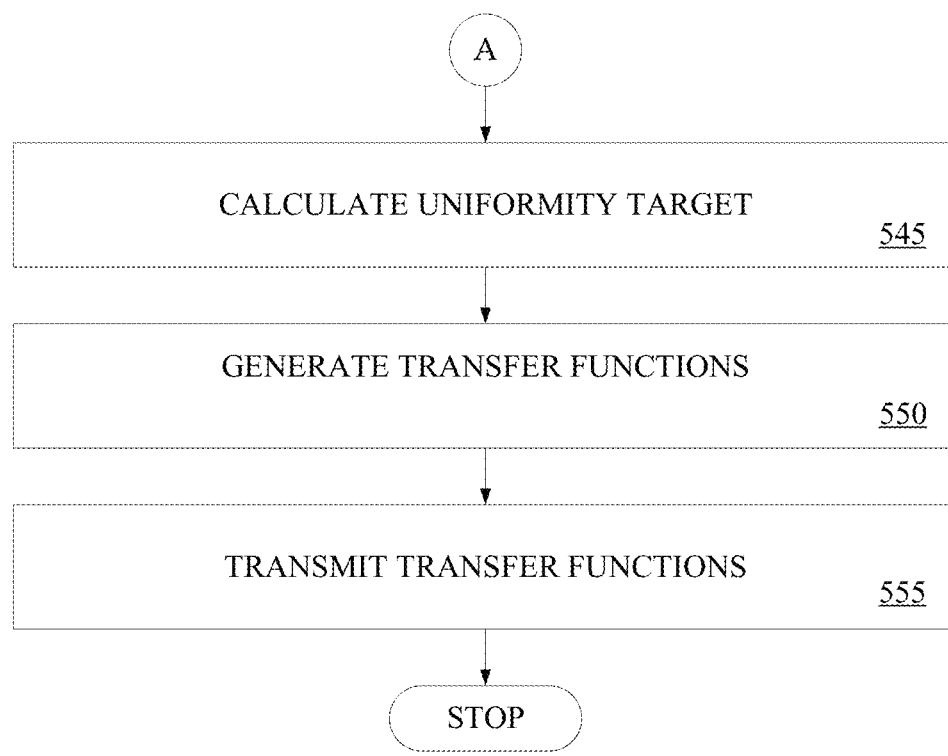

FIGS. 5A&5B is a flow diagram illustrating one embodiment of a process 500 for performing uniformity compensation. Process 500 may be performed by processing logic that may include hardware (e.g., circuitry, dedicated logic, programmable logic, microcode, etc.), software such as instructions run on a processing device, or a combination thereof. In one embodiment, process 500 is performed by uniformity compensation module 216.

At processing block 505 (FIG. 5A), print image measurement data is received. As discussed above, the print image measurement data comprises measured color data. At processing block 510, average values may be calculated for the ink deposition measurement data. At processing block 515, the color measurement data is converted to color response data as needed. At processing block 520, a scaling of the color response data is performed.

At processing block 525, intermediate images are generated based on the color response data. Subsequently, these generated intermediate images are stored. At decision block 530, a determination is made as to whether historical data (e.g., historical sets of intermediate images) is available to be used for uniformity compensation. If so, one or more previously stored sets of intermediate images are selected, processing block 535. At processing block 540, a weighted averaging of the selected sets of intermediate images and the generated current intermediate images is performed.

Subsequently, or upon a determination at decision block 530 that no historical data is available, a uniformity target is calculated based on the corresponding intermediate image data, processing block 545 (FIG. 5B). At processing block 550, transfer functions for each pel forming element 165 are generated. As discussed above, the transfer functions are generated based on the average of the generated current intermediate images and the historical sets of intermediate images upon a determination the historical data is available; and generated based only on the generated intermediate images upon a determination the historical data is not available. At processing block 555, the generated transfer functions may be transmitted to be used for uniformity compensation by printer 160.

Although shown as a component outside of print controller 140, other embodiments may feature uniformity compensation module 216 included within an independent device, or combination of devices, communicably coupled to print controller 140. For instance, FIG. 6 illustrates one embodiment of a uniformity compensation module 216 implemented in a network 600. As shown in FIG. 6, uniformity compensation module 216 is included within a computing system 610 and transmits transfer functions to printing system 130 via a cloud network 650. Printing system 130 receives the transfer functions.

Figure 7:
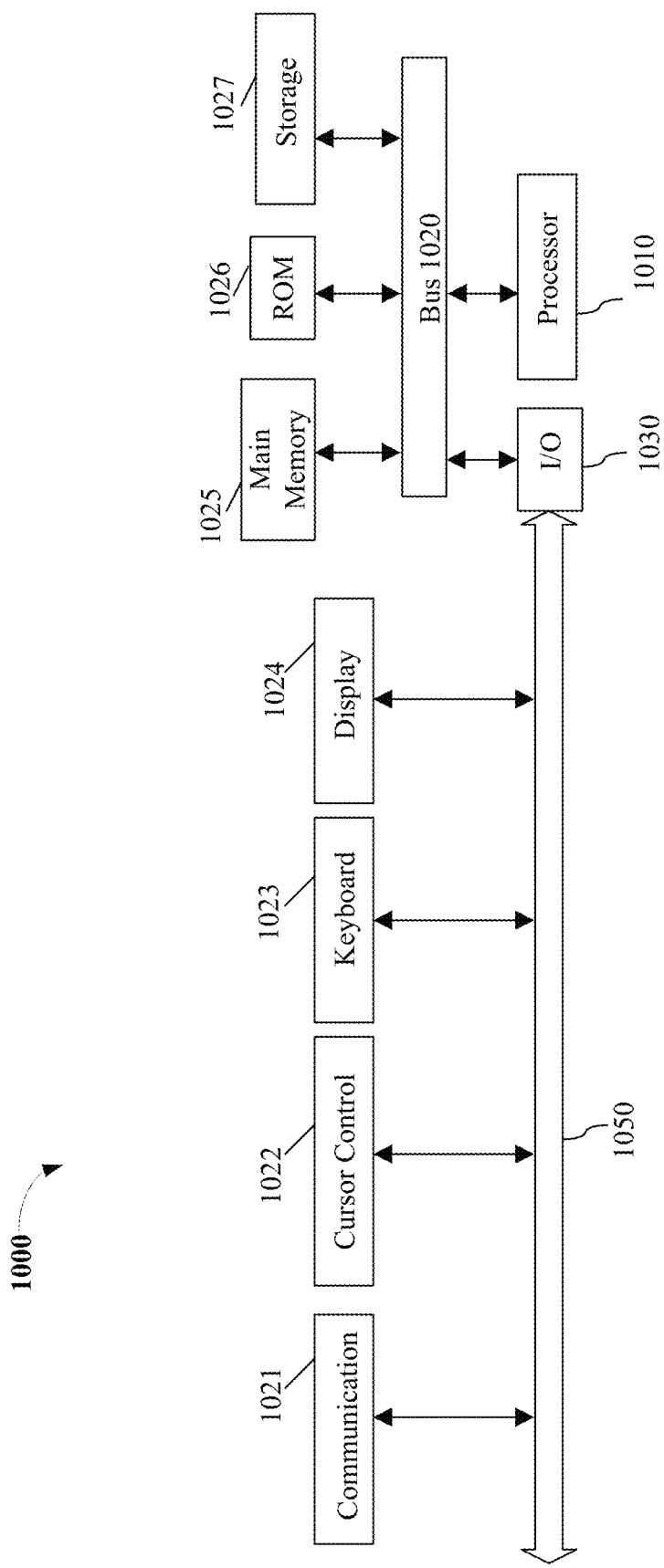
FIG. 7 illustrates one embodiment of a computer system.

FIG. 7 illustrates a computer system 1000 on which printing system 130 and/or uniformity compensation module 216 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1027 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store uniformity compensation logic; and one or more processors coupled with the at least one physical memory device to execute the uniformity compensation logic to receive print image measurement data corresponding with each of a plurality of pel forming elements, generate a first set of intermediate images based on the print image measurement data, determine whether historical sets of intermediate images are available, generate first transfer functions corresponding to each of the pel forming elements based on the first set of intermediate images and the historical sets of intermediate images upon a determination that the historical sets of intermediate images are available and transmit the first transfer functions for each of the pel forming elements.

Example 2 includes the subject matter of Example 1, wherein the uniformity compensation logic further computes a weighted average of the first set of intermediate images and the historical sets of intermediate images and computes first target responses for each of the pel forming elements based on the weighted average, wherein the first transfer functions are generated based on the first target responses.

Example 3 includes the subject matter of Examples 1 and 2, wherein the uniformity compensation logic further selects a plurality of previously generated sets of intermediate images as the historical sets of intermediate images upon a determination that the historical sets of intermediate images are available.

Example 4 includes the subject matter of Examples 1-3, wherein the plurality of previously generated sets of intermediate images are selected based on one or more printer settings.

Example 5 includes the subject matter of Examples 1-4, wherein the printer settings comprises one or more of paper type, printer conditions, print speed, and resolution.

Example 6 includes the subject matter of Examples 1-5, wherein the uniformity compensation logic further generates second transfer functions corresponding to each of the pel forming elements based on the first set of intermediate images upon a determination that the historical sets of intermediate images are not available.

Example 7 includes the subject matter of Examples 1-6, wherein the uniformity compensation logic further computes average values of the received print image measurement data, converts the average values to color response data and generates the first set of intermediate images based on the color response data.

Example 8 includes the subject matter of Examples 1-7, wherein the uniformity compensation logic further computes a second target response for each of the pel forming elements based on a second set of intermediate images, wherein the second transfer functions are generated based on the second target responses.

Example 9 includes the subject matter of Examples 1-8, wherein the uniformity logic further stores the first set of intermediate images in the historical sets of intermediate images.

Example 10 includes the subject matter of Examples 1-9, further comprising a printer to receive the first transfer functions.

Some embodiments pertain to Example 11 that includes at least one computer readable medium having instructions stored thereon, which when executed by one or more processors, cause the processors to receive print image measurement data corresponding with each of a plurality of pel forming elements, generate a first set of intermediate images based on the print image measurement data, determine whether historical sets of intermediate images are available, generate first transfer functions corresponding to each of the pel forming elements based on the first set of intermediate images and the historical sets of intermediate images upon a determination that the historical sets of intermediate images are available and transmit the first transfer functions for each of the pel forming elements.

Example 12 includes the subject matter of Example 11, having instructions stored thereon, which when executed by one or more processors, further cause the processors to compute a weighted average of the first set of intermediate images and the historical sets of intermediate images and compute first target responses for each of the pel forming elements based on the weighted average, wherein the first transfer functions are generated based on the first target responses.

Example 13 includes the subject matter of Examples 11 and 12, having instructions stored thereon, which when executed by one or more processors, further cause the processors to select a plurality of previously generated sets of intermediate images as the historical sets of intermediate images upon a determination that the historical sets of intermediate images are available.

Example 14 includes the subject matter of Examples 11-13, having instructions stored thereon, which when executed by one or more processors, further cause the processors to generate second transfer functions corresponding to each of the pel forming elements based on the first set of intermediate images upon a determination that the historical sets of intermediate images are not available.

Example 15 includes the subject matter of Examples 11-14, having instructions stored thereon, which when executed by one or more processors, further cause the processors to compute average values of the received print image measurement data, converts the average values to color response data and generates the first set of intermediate images based on the color response data.

Some embodiments pertain to Example 16 that includes a method comprising receiving print image measurement data corresponding with each of a plurality of pel forming elements, generating a first set of intermediate images based on the print image measurement data, determining whether historical sets of intermediate images are available, generating first transfer functions corresponding to each of the pel forming elements based on the first set of intermediate images and the historical sets of intermediate images upon a determination that the historical sets of intermediate images are available and transmitting the first transfer functions for each of the pel forming elements.

Example 17 includes the subject matter of Example 16, further comprising computing a weighted average of the first set of intermediate images and the historical sets of intermediate images; and computing first target responses for each of the pel forming elements based on the weighted average, wherein the first transfer functions are generated based on the first target responses.

Example 18 includes the subject matter of Examples 16 and 17, further comprising selecting a plurality of previously generated sets of intermediate images as the historical sets of intermediate images upon a determination that the historical sets of intermediate images are available.

Example 19 includes the subject matter of Examples 16-18, further comprising computing average values of the received print image measurement data, converts the average values to color response data and generates the first set of intermediate images based on the color response data.

Example 20 includes the subject matter of Examples 16-19, further comprising computing a second target response for each of the pel forming elements based on a second set of intermediate images, wherein the second transfer functions are generated based on the second target responses.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store uniformity compensation logic; and
   one or more processors coupled with the at least one physical memory device to execute the uniformity compensation logic to:
   receive print image measurement data corresponding with each of a plurality of pel forming elements;
   generate a first set of intermediate images based on the print image measurement data;
   determine whether historical sets of intermediate images are available;
   generate first transfer functions corresponding to each of the pel forming elements based on the first set of intermediate images and the historical sets of intermediate images upon a determination that the historical sets of intermediate images are available; and
   transmit the first transfer functions for each of the pel forming elements.

2. The system of claim 1, wherein the uniformity compensation logic further computes a weighted average of the first set of intermediate images and the historical sets of intermediate images and computes first target responses for each of the pel forming elements based on the weighted average, wherein the first transfer functions are generated based on the first target responses.

3. The system of claim 2, wherein the uniformity compensation logic further selects a plurality of previously generated sets of intermediate images as the historical sets of intermediate images upon a determination that the historical sets of intermediate images are available.

4. The system of claim 3, wherein the plurality of previously generated sets of intermediate images are selected based on one or more printer settings.

5. The system of claim 4, wherein the printer settings comprises one or more of paper type, printer conditions, print speed, and resolution.

6. The system of claim 2, wherein the uniformity compensation logic further generates second transfer functions corresponding to each of the pel forming elements based on the first set of intermediate images upon a determination that the historical sets of intermediate images are not available.

7. The system of claim 3, wherein the uniformity compensation logic further computes average values of the received print image measurement data, converts the average values to color response data and generates the first set of intermediate images based on the color response data.

8. The system of claim 7, wherein the uniformity compensation logic further computes a second target response for each of the pel forming elements based on a second set of intermediate images, wherein the second transfer functions are generated based on the second target responses.

9. The system of claim 1, wherein the uniformity logic further stores the first set of intermediate images in the historical sets of intermediate images.

10. The system of claim 1, further comprising a printer to receive the first transfer functions.

11. At least one non-transitory computer readable medium having instructions stored thereon, which when executed by one or more processors, cause the processors to:
receive print image measurement data corresponding with each of a plurality of pel forming elements;
generate a first set of intermediate images based on the print image measurement data;
determine whether historical sets of intermediate images are available;
generate first transfer functions corresponding to each of the pel forming elements based on the first set of intermediate images and the historical sets of intermediate images upon a determination that the historical sets of intermediate images are available; and
transmit the first transfer functions for each of the pel forming elements.

12. The computer readable medium of claim 11, having instructions stored thereon, which when executed by one or more processors, further cause the processors to:
compute a weighted average of the first set of intermediate images and the historical sets of intermediate images; and
compute first target responses for each of the pel forming elements based on the weighted average, wherein the first transfer functions are generated based on the first target responses.

13. The computer readable medium of claim 12, having instructions stored thereon, which when executed by one or more processors, further cause the processors to select a plurality of previously generated sets of intermediate images as the historical sets of intermediate images upon a determination that the historical sets of intermediate images are available.

14. The computer readable medium of claim 12, having instructions stored thereon, which when executed by one or more processors, further cause the processors to generate second transfer functions corresponding to each of the pel forming elements based on the first set of intermediate images upon a determination that the historical sets of intermediate images are not available.

15. The computer readable medium of claim 13, having instructions stored thereon, which when executed by one or more processors, further cause the processors to:
compute average values of the received print image measurement data;
convert the average values to color response data; and
generate the first set of intermediate images based on the color response data.

16. A method comprising:
receiving print image measurement data corresponding with each of a plurality of pel forming elements;
generating a first set of intermediate images based on the print image measurement data;
determining whether historical sets of intermediate images are available;
generating first transfer functions corresponding to each of the pel forming elements based on the first set of intermediate images and the historical sets of intermediate images upon a determination that the historical sets of intermediate images are available; and
transmitting the first transfer functions for each of the pel forming elements.

17. The method of claim 16, further comprising:
computing a weighted average of the first set of intermediate images and the historical sets of intermediate images; and
computing first target responses for each of the pel forming elements based on the weighted average, wherein the first transfer functions are generated based on the first target responses.

18. The method of claim 17, further comprising selecting a plurality of previously generated sets of intermediate images as the historical sets of intermediate images upon a determination that the historical sets of intermediate images are available.

19. The method of claim 18, further comprising:
computing average values of the received print image measurement data;
converting the average values to color response data; and
generating the first set of intermediate images based on the color response data.

20. The method of claim 19, further comprising computing a second target response for each of the pel forming elements based on a second set of intermediate images, wherein the second transfer functions are generated based on the second target responses.

* * * * *